May 31, 1949.　　　　　P. M. WAITE　　　　　2,471,987
UNIVERSAL JOINT
Filed July 3, 1945　　　　　　　　　　　　2 Sheets-Sheet 1
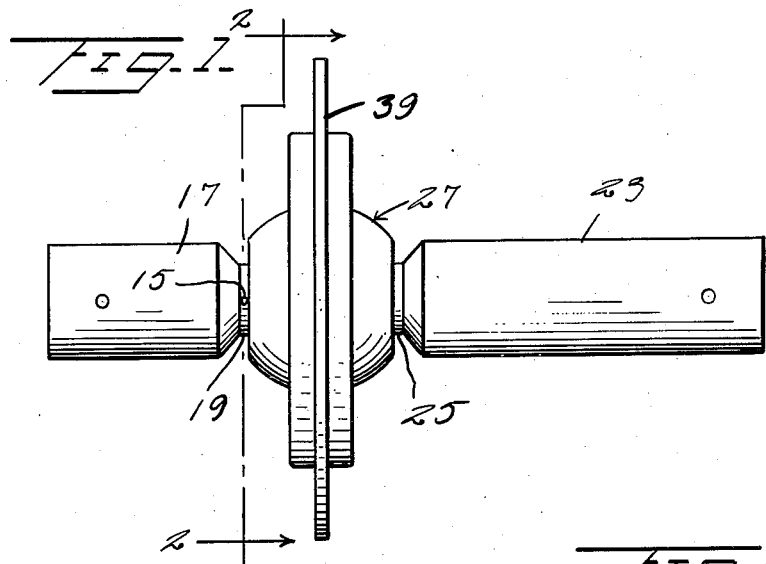
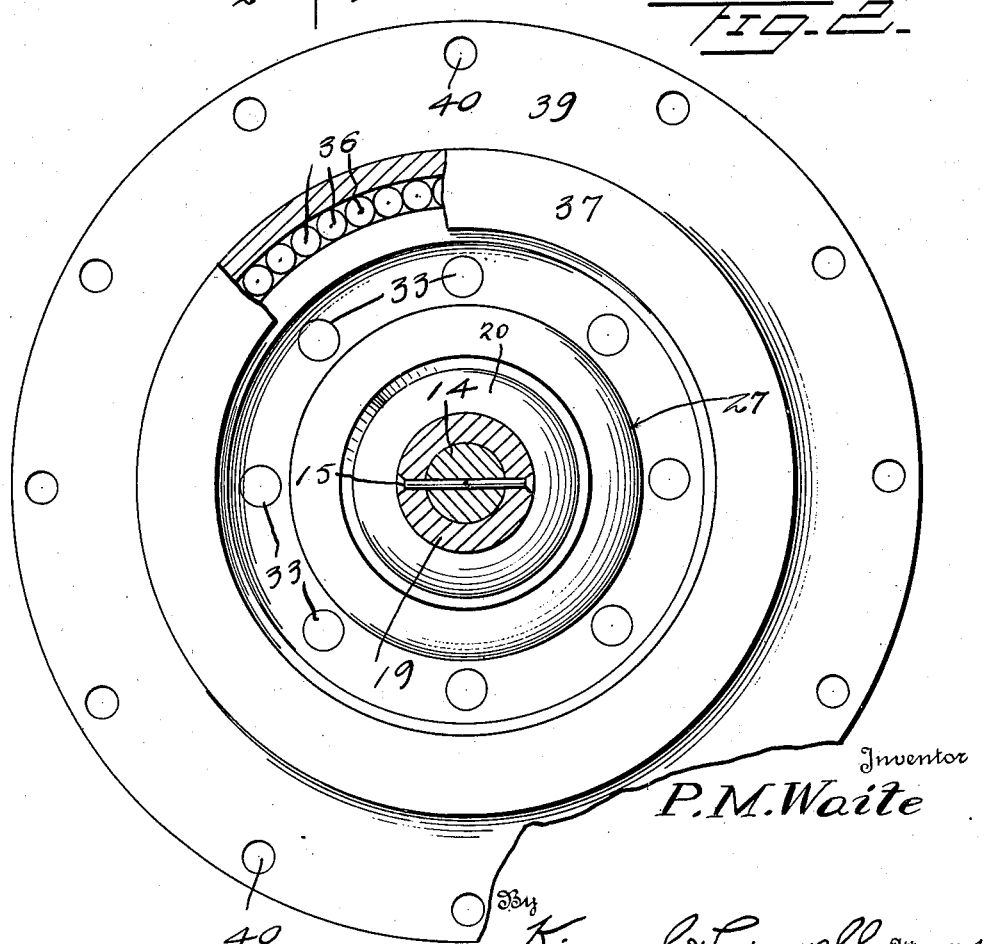
Inventor
P. M. Waite
By Kimmel & Crowell
Attorneys May 31, 1949.   P. M. WAITE   2,471,987
UNIVERSAL JOINT
Filed July 3, 1945   2 Sheets-Sheet 2
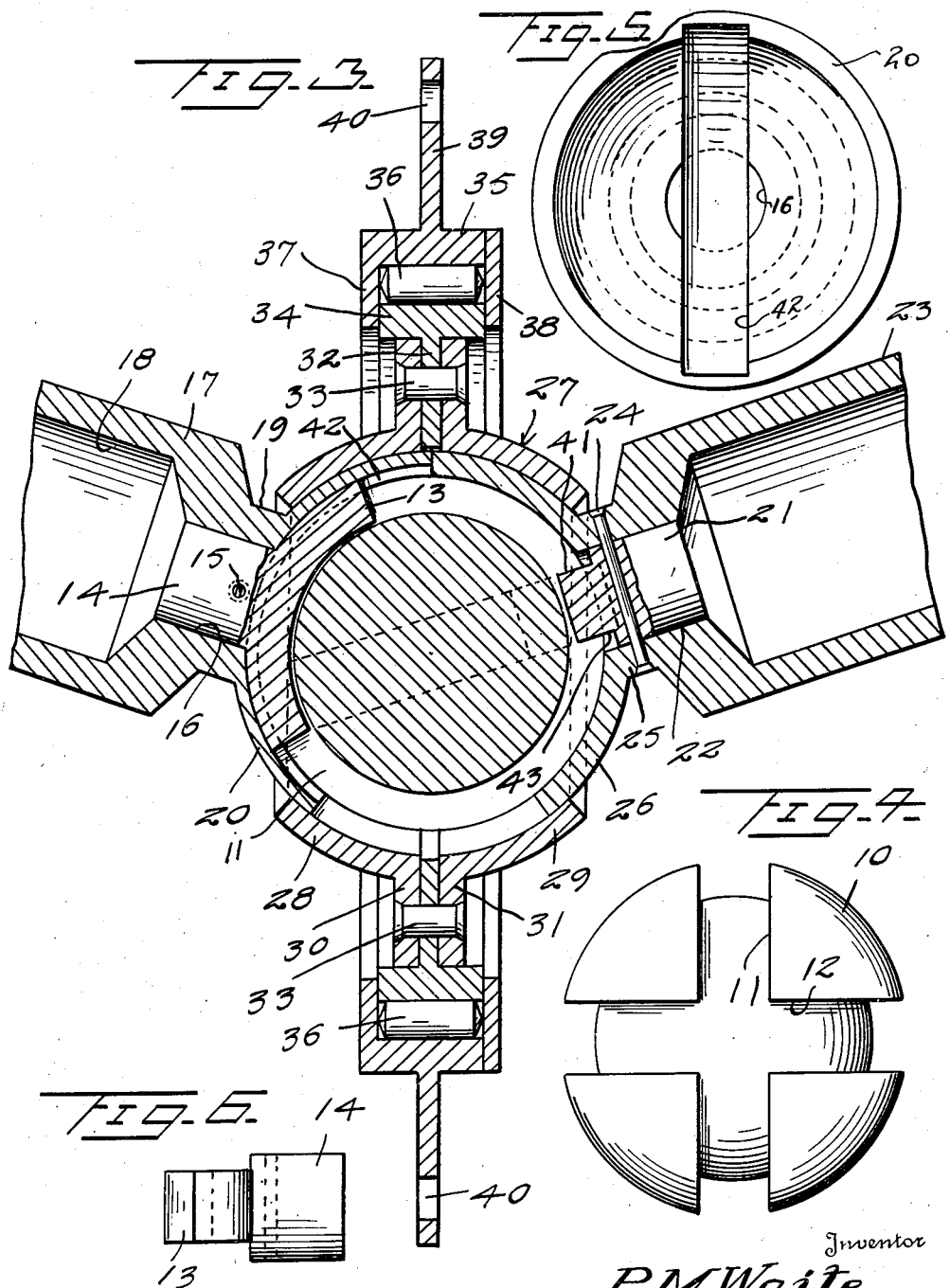
Inventor
P. M. Waite
By Kimmel & Crowell Attorneys Patented May 31, 1949

2,471,987

UNITED STATES PATENT OFFICE 2,471,987

UNIVERSAL JOINT

Philip M. Waite, Corry, Pa.

Application July 3, 1945, Serial No. 602,991

1 Claim. (Cl. 64—16)

This invention relates to improvements in universal joints.

An object of this invention is to provide an improve universal joint which has been designed especially for use in airplanes, but it will be understood that these joints may find other uses where two shafts are connected together at an angle, one relative to the other.

Another object of this invention is to provide a universal joint structure including a support for supporting the central portion of the joint so as to eliminate any wobbling when the shafts connected therewith are rotated.

A further object of this invention is to provide a joint of this kind including a central block and a pair of key members engaging in grooves formed in the block with the key members secured to coupling elements which are adapted to be coupled to shafts which may not be in axial alinement.

With the foregoing objects in view, and others which may hereinafter more fully appear, the invention consists of the novel construction, combination and arrangement of parts, as will be more specifically described, and illustrated in the accompanying drawings, wherein are shown embodiments of the invention, but it is to be understood that changes, variations and modifications may be restorted to which fall within the scope of the invention, as claimed.

In the drawings:

Figure 1 is a detail side elevation of a universal joint constructed according to an embodiment of this invention, Figure 2 is a sectional view, partly broken away, taken on the line 2—2 of Figure 1, Figure 3 is a fragmentary longitudinal section of the joint, Figure 4 is a detail side elevation of the central block or body, Figure 5 is a detail inner end elevation of one of the coupling members and keys, and Figure 6 is a detail side elevation of one of the key members.

Referring to the drawings the numeral 10 designates generally a block which is in the form of a sphere which constitutes a pivot member. The sphere 10 is formed with right angularly related annular grooves 11 and 12. A key member 13, which is of longitudinal arcuate configuration, is adapted to engage in one of the grooves, as for example, groove 11. The key member 13 has extended from the outer or convex side thereof a stud 14. The stud 14 is pressed tightly into the bore 16, formed in the inner end of socket member 17 and additionally secured by a pin or fastening member 15. The socket member 17 is provided with a main bore 18 within which one end of a shaft is adapted to firmly be secured. The socket member 17 is provided with a reduced stud 19 at the inner end thereof, and a cup-shaped member 20 is formed integral with the stud 19 which has an arcuate keyway 42 therein within which the outer portion of the key 13 also engages. A second longitudinally arcuate key member 41 engages in the other of the grooves, as for example groove 12, and is provided with a stud 21 which is secured in a counter bore 22 formed in the inner end of a socket member 23. The stud 21 is pressed tightly in the counter bore 22, and additionally secured therein by means of a rivet or fastening member 24 which engages through a reduced diameter extension 25 formed at the inner end of the socket member 23. The socket member 23 has formed integral with the inner end of the extension 25 thereof a cup-shaped member 26. The cup-shaped member 26 loosely engages about the ball or pivot member 10, and the outer portion of the key member 20 engages in a keyway 43 formed in the inner side of the cup-shaped member 26. These two cup-shaped members 20 and 26 are substantially less than semi-spherical so that the socket members 17 and 23 may be disposed on different angles with respect to each other, the angular adjustment of these socket members being limited by the size of the cup-shaped members 20, which, at the greatest adjustment of the socket members 17 and 23 relative to each other, will contact one with the other.

The joint structure hereinbefore described is adapted to be rotatably supported by means of a supporting casing structure, generally designated as 27. The casing structure 27 includes complementary cup-shaped members 28 and 29 which engage about the cup-shaped members 20 and 26 respectively.

The cup-shaped casing members 28 and 29 have formed with the inner ends thereof annular flanges 30 and 31 respectively. The flanges 30 and 31 have positioned therebetween an annular member or ring 32, and preferably fastening members 33 secure the flanges 30, 31 and 32 firmly together.

An annular anti-friction race member 34 is carried by the annulus or ring 32, and a second annular race member 35 is disposed outwardly of the race member 30. Anti-friction members 36 are interposed between the two race members 34 and 35. The race member 35 has formed integral with one end thereof an annular flange 37, and an annular plate 38 may be secured to the other end of the race member 35 so as to hold the anti-friction members 36 against endwise movement. The flange 37 and the ring 38 overlap the inner race member 34. The ring 38 may be secured to the race 35 by any suitable means. The outer race 35 has formed integral therewith, an annular flange 39, which is formed with openings 40 by means of which the joint supporting member 27 may be firmly secured to a stationary support.

Preferably, the flange 39 is adapted to be secured to a wall or the like through which the joint is adapted to extend, one portion of the joint structure extending from one side of the wall and the other portion of the joint extending from the other side of the wall.

With a universal joint construction as hereinbefore described the torque is borne by the two arcuate key member which are slidable in the grooves of the ball, and also by the opposite walls of the grooves and by the cup-shaped members 20 and 26. The pins 15 and 24 are used particularly to hold the related parts together and prevent thrust or end play. It will, of course, be understood that the shafts connected to the socket members 17 and 23 may be connected thereto by coupling members telescoping over members 17 and 23.

What is claimed is:

A universal joint comprising a pair of oppositely extending socket members adapted to be secured to a pair of shafts, confronting cup-shaped members carried by the inner ends of said socket members, a ball loosely disposed in said cup-shaped members and formed with a pair of right angularly disposed grooves, an arcuate key fixedly carried by each cup-shaped member and slidably engaging in said grooves, a casing about said cup-shaped members formed of parti-spherical members, and means supporting said casing, said parti-spherical members including confronting annular flanges, an inner anti-friction race about said flanges, a flange carried by said inner race engaging between said first named flanges, means securing all of said flanges together, an outer race, means for securing said outer race to a stationary support, and anti-friction elements between said races.

PHILIP M. WAITE.

REFERENCES CITED

The following references are of record in the file of this patent:

UNITED STATES PATENTS

| Number | Name | Date |
|---|---|---|
| 1,148,594 | Lehman | Aug. 3, 1915 |
| 1,579,630 | Bertsche | Apr. 6, 1926 |
| 1,693,778 | Engman | Dec. 4, 1928 |
| 2,331,982 | Johnson | Oct. 19, 1943 |